H. C. WALTER.
MACHINE FOR AND METHOD OF CUTTING GEARS.
APPLICATION FILED FEB. 19, 1916.

1,341,953.

Patented June 1, 1920.

Inventor:
Henry C. Walter,

H. C. WALTER.
MACHINE FOR AND METHOD OF CUTTING GEARS.
APPLICATION FILED FEB. 19, 1916.

1,341,953.

Patented June 1, 1920.

H. C. WALTER.
MACHINE FOR AND METHOD OF CUTTING GEARS.
APPLICATION FILED FEB. 19, 1916.

1,341,953.

Patented June 1, 1920.
8 SHEETS—SHEET 5.

Inventor:
Henry C. Walter,
by Emery, Booth, Janney & Varney
Attys.

H. C. WALTER.
MACHINE FOR AND METHOD OF CUTTING GEARS.
APPLICATION FILED FEB. 19, 1916.

1,341,953.

Patented June 1, 1920.
8 SHEETS—SHEET 6.

Inventor:
Henry C. Walter,

H. C. WALTER.
MACHINE FOR AND METHOD OF CUTTING GEARS.
APPLICATION FILED FEB. 19, 1916.

1,341,953.

Patented June 1, 1920.

Inventor:
Henry C. Walter;
by Emery, Booth, Janney & Varney Attys.

H. C. WALTER.
MACHINE FOR AND METHOD OF CUTTING GEARS.
APPLICATION FILED FEB. 19, 1916.

1,341,953.

Patented June 1, 1920.
8 SHEETS—SHEET 8.

Inventor:
Henry C. Walter,
by Emery, Booth, Janney & Varney
Attys

UNITED STATES PATENT OFFICE.

HENRY C. WALTER, OF BRIDGEPORT, CONNECTICUT, ASSIGNOR TO THE LOCOMOBILE COMPANY OF AMERICA, OF NEW YORK, N. Y., A CORPORATION OF WEST VIRGINIA.

MACHINE FOR AND METHOD OF CUTTING GEARS.

1,341,953.  Specification of Letters Patent.  Patented June 1, 1920.

Application filed February 19, 1916. Serial No. 79,424.

*To all whom it may concern:*

Be it known that I, HENRY C. WALTER, a citizen of the United States, and a resident of Bridgeport, in the county of Fairfield and State of Connecticut, have invented an Improvement in Machines for and Methods of Cutting Gears, of which the following description, in connection with the accompanying drawings, is a specification, like characters on the drawings representing like parts.

This invention relates to gear cutting machines and methods, and is more particularly concerned with the cutting of teeth which are curved from end to end on an arc of a circle.

My invention will be best understood by reference to the following description, when taken in connection with the accompanying drawings, showing one specific embodiment thereof, while its scope will be more particularly pointed out in the appended claims.

Figures 2, 3, 4:
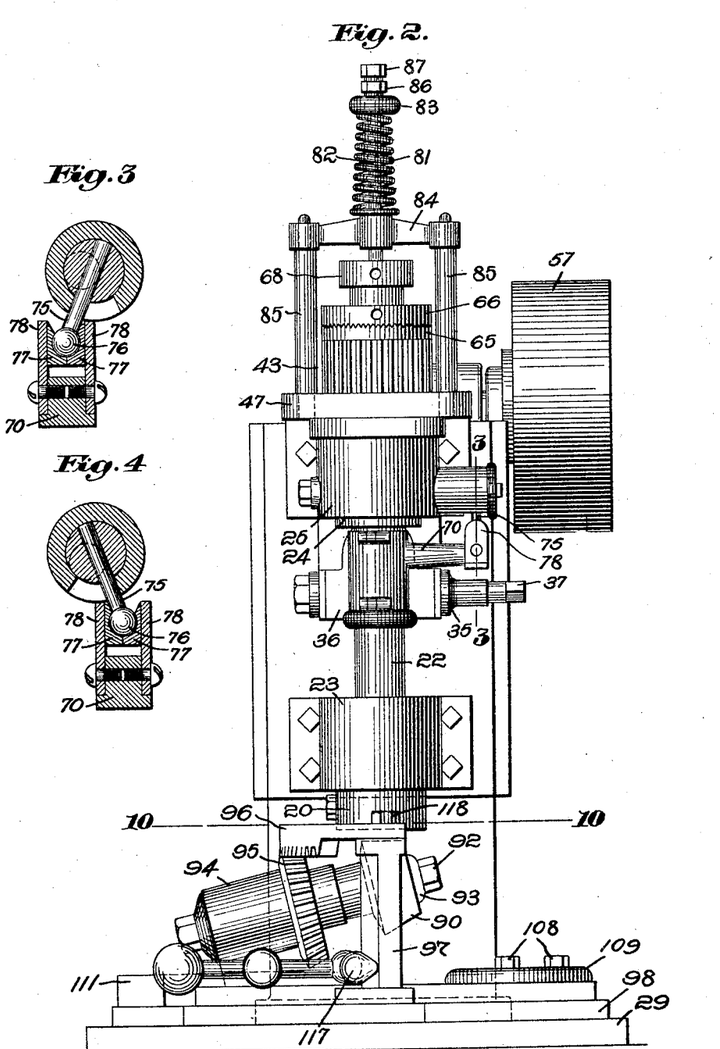
Fig. 2 is a front elevation of the machine shown in Fig. 1.
Fig. 3 is a detail sectional view on line 3—3 of Fig. 2, showing the parts in one position.
Fig. 4 is a detail sectional view, similar to Fig. 3, but showing the parts in another position.

The machine and method which I will now describe are particularly intended and adapted for the cutting of bevel gears, but it will be understood that the invention is not limited to this type of gears, but may be employed in connection with others, such for example as spur gears, racks and the like. Referring to the drawings, and to the embodiment of my invention which I have selected for illustration, I have there shown a gear-cutting machine having a cutter head 20 carrying a cutter 21, the head being suitably formed on or adapted to a cutter spindle 22. The cutter head is mounted to turn and slide freely in an axial direction in a suitable bearing 23, while the spindle is mounted in a suitable bearing 24, herein in the form of a bushing mounted to slide axially in a bearing 25 (best shown in Fig. 2). The bearings 23 and 25 are preferably adjustable axially, and to that end are herein secured to a slide 26, (best shown in Figs. 8 and 9) the latter being mounted to slide in a suitable guide 27. The latter is secured to a suitable support, herein a column 28 mounted on a base 29, said base also constituting the support for work-holding mechanism hereinafter described.

Any suitable mechanism may be employed for adjusting the slide 26 and parts carried thereby, in order to effect the feeding of the cutter 21 to the work, but herein I employ for such purpose a rack 30 (best shown in Fig. 8) secured to the guide 27 and meshing with a pinion 31, the latter having a shaft 32, to which is fastened a worm gear 33, which in turn meshes with a worm 34 suitably formed on or secured to a shaft 35 mounted in an appropriate bearing 36 on the slide 26. As a convenient means for turning the shaft 35 to effect the desired adjustment, said shaft may be provided with a polygonal head 37 to receive a wrench not shown.

It will be understood that, by turning the shaft 35, its rotation is imparted through the worm 34 and worm gear 33 to the pinion 31, and since the rack 30 is fixed, the pinion will travel lengthwise of the same in one direction or the other, as the case may be, thus carrying with it the slide 26, in which it is journaled. It should also be observed that owing to the use of the worm and worm gear, the adjusting mechanism is self-locking, and the slide 26 will be held fixed in whatever position it is left.

The spindle 22 and bushing 24 may be caused to move axially in unison by providing the spindle with a collar or annular projection 38 interposed between thrust washers 39 and 40 in a recess 41 in the bushing, there being provided a ring 42 threaded into the bushing and serving as a means of adjustment to take up end play, as well as to receive the thrust in one direction.

Figure 1:
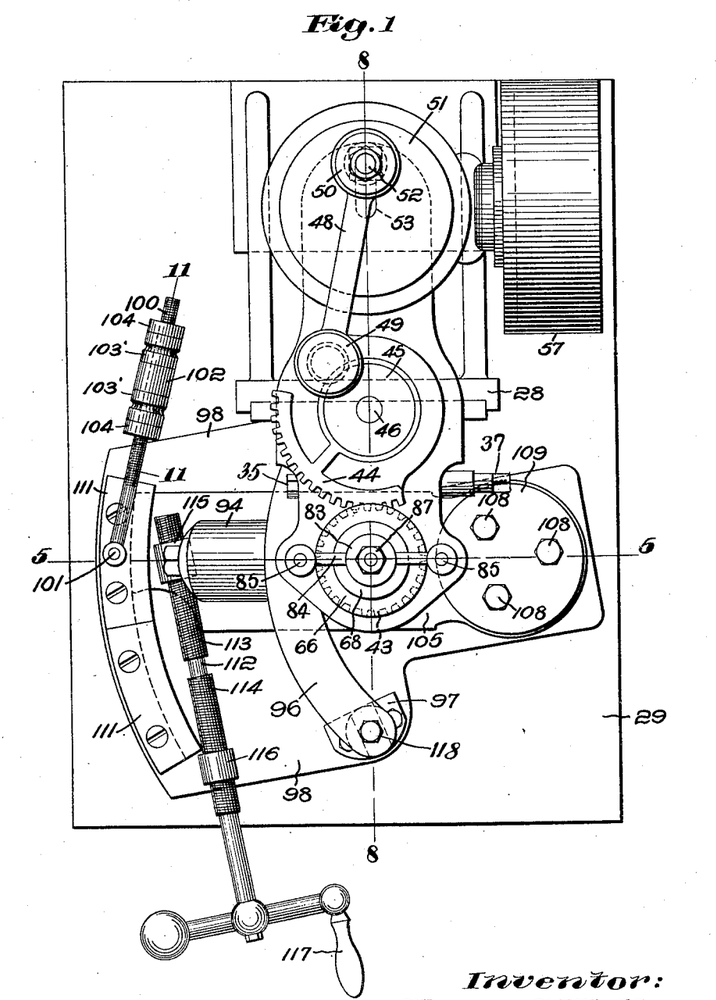
Figure 1 is a plan of a gear-cutting machine embodying my invention, and by means of which the method can be carried into effect, the machine as shown being arranged for cutting a bevel pinion.
Figures 8, 9:
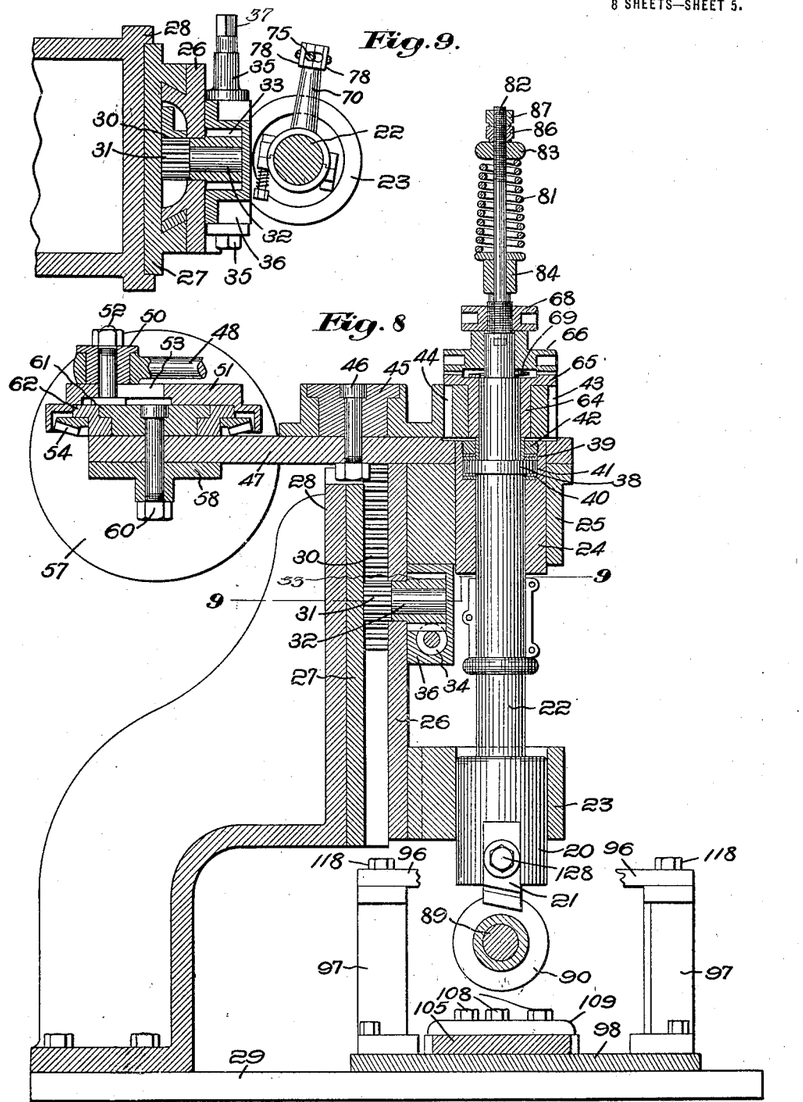
Fig. 8 is a sectional view partly in elevation on line 8—8 of Fig. 1.
Fig. 9 is a detail sectional view on line 9—9 of Fig. 8.
Figure 10:
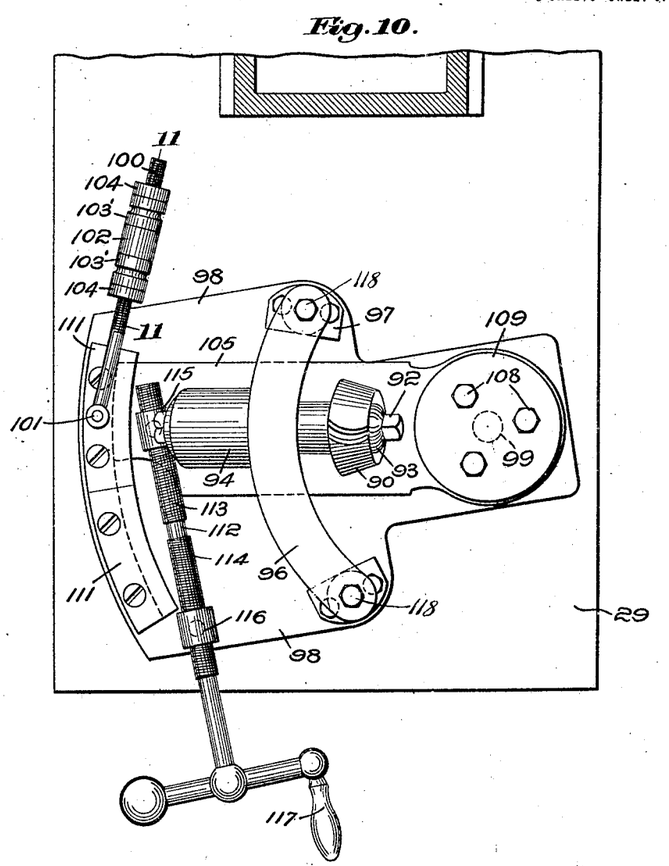
Fig. 10 is a plan section on line 10—10 of Fig. 2.

As a means for oscillating the spindle 22, the latter is herein provided with a pinion 43 meshing with a segmental gear 44, (best shown in Fig. 1) the latter being swiveled on a suitable bearing or stud 45, which, as herein shown, is secured by a bolt 46 to a support 47 (best shown in Fig. 8). The latter is herein in the form of a bracket, which is secured to the slide 26 and moves vertically therewith, carrying the mechanism which it supports. An oscillatory motion is imparted to the segmental gear 44 by a link 48 having one end pivoted to a stud 49 (see Fig. 6) carried by the segmental gear, and having its other end (see Fig. 8) pivoted to a bushing 50 constituting a crank pin which is adjustably fixed to a crank disk 51 by the use of a T bolt 52 passing axially through the bushing and into a radial slot 53 in the crank disk. It is evident that by adjusting the crank pin radially, the extent of oscillation of the spindle 22 may be varied.

Rotary motion is imparted to the crank disk 51 by suitable means, herein a bevel gear 54, (best shown in Fig. 7) the latter meshing with a bevel pinion 55 secured to a shaft 56 driven by suitable means, herein a pulley 57. The shaft 56 may be journaled in a suitable bearing, herein in the form of a bearing bracket 58 secured to the bracket 47 by a cap-screw 59 and a stud 60. This stud may also serve to secure to the bracket 47 a bearing member 61 for a ring 62, to which the gear 54 is attached. As herein shown, the crank disk 51 is provided with a laterally extending and depending flange 63, (see Fig. 6) constituting a housing for the bevel gear 54.

Figure 5:
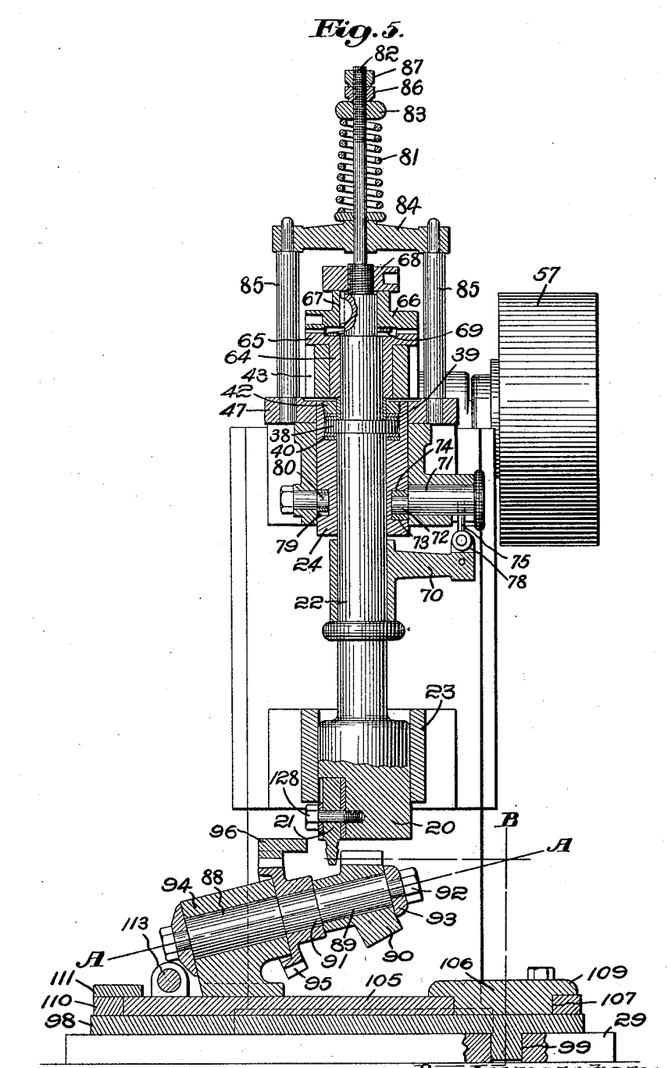
Fig. 5 is a sectional view, partly in elevation, on line 5—5 of Fig. 1.

It will now be evident that by the use of the described mechanism, the cutter 21 may be oscillated through an arc whose length is determined by the throw of the crank pin 50. The point of commencement and ending of the stroke of the cutter may be adjusted by the use of suitable means adjustably to attach the spindle 22 to the pinion 43 which oscillates it. In the present instance, the pinion is fixedly secured to a bushing 64, (best shown in Fig. 5) the latter being loosely mounted on the spindle 22, and having a toothed clutch member 65 normally engaged with a similar toothed clutch member 66, which latter is splined on a spindle by means of a key 67. A nut 68 threaded onto the spindle normally holds the clutch member 66 in interlocking engagement with the clutch member 65, thus locking the spindle to the pinion. When, however, it becomes desirable to disconnect the spindle from the pinion so as to swing the cutter about the axis of the spindle, this may be accomplished by simply loosening the nut 68 to a sufficient extent to allow the teeth of the clutch member 66 to be withdrawn from engagement with those of the clutch member 65, and when the cutter has been set in the desired position, the spindle is again secured to the pinion by meshing the clutch members and securing them together by screwing down the nut 68. If desired, the clutch member 66 may be lifted out of engagement with the clutch member 65 by a spring 69 interposed between them.

The cutter 21 is intended to perform its work by a planing action, and it is therefore desirable that it shall be lifted from the work each time on its return or non-working stroke. To this end, therefore, I have herein provided suitable mechanism for moving the cutter spindle axially in opposite directions in properly timed relation with oscillatory motion of the cutter. Fixedly secured to the spindle 22 is an arm 70 (best shown in Fig. 5) whose oscillatory motion is utilized to impart an endwise motion to the spindle. One convenient means of accomplishing this is by the provision of a rocking shaft 71, connected to the bushing 24 and to the arm 70. As herein shown, the shaft 71 is provided with an eccentric portion 72, having thereon a roller 73 located in a slot 74 formed in the bushing 24, and extending in a generally horizontal direction. Thus, it will be seen that by simply imparting a rocking motion to the shaft 71, the bushing 24 may be moved axially. This is accomplished by providing the shaft 71 with a depending arm 75 connected to the arm 70 by a suitable form of universal joint, herein comprising a ball 76 formed on the arm 75, and located in a socket composed of a pair of socket members 77, which are maintained in coöperative relation with the ball by a pair of guides 78 carried by the arm 70, and embracing the socket members, the latter being arranged to slide vertically between the guides as the arm swings to and fro. As a means for limiting the axial motion of the bushing 24, the latter is herein provided with a vertical slot 79 in which is located a stop 80.

It will now be evident that the mechanism just described utilizes the oscillatory motion of the spindle 22 to impart an axial motion thereto, whereby the cutter may be lifted during its return or non-working stroke, and again lowered for the next working stroke. As a means for sustaining the spindle and associated parts and lightening the work which the mechanism for axially moving the same is called upon to do, I have herein provided a spring 81 (best shown in Fig. 5) arranged to exert a lifting tendency upon the spindle, this being accomplished by providing the latter with an upwardly extending stem 82, which the spring encircles, the latter being interposed between a collar 83 on the spindle and a supporting yoke 84 sustained by a pair of uprights 85 mounted on the bracket 47. A nut 86 and check-nut 87 may be employed for varying the tension of the spring 81.

Figure 11:
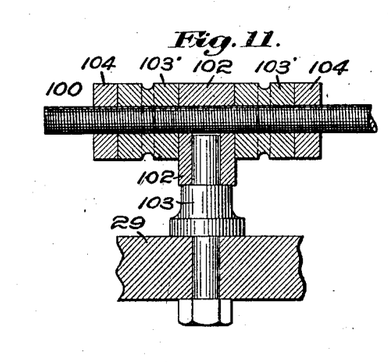
Fig. 11 is a detail sectional view on an enlarged scale on line 11—11 of Fig. 10.
Figure 12:
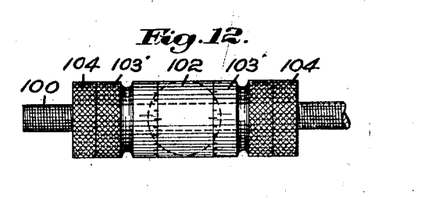
Fig. 12 is a detail plan of the parts shown in Fig. 11.

In Figs. 1, 2, 5, 6, 8 and 10, I have shown the machine equipped for cutting bevel pinions, and for that purpose have provided a work-holding and adjusting mechanism comprising a work-holding spindle 88 (best shown in Fig. 5) having a reduced portion 89 to receive a blank 90, which is clamped against a shoulder 91 by a nut 92 and collar 93. The work-holding spindle is mounted in a suitable bearing bracket 94, in which it is held against endwise movement, but is free to turn under the influence of a bevel pinion 95 secured to the spindle and meshing with a segmental bevel gear 96. The latter is rigidly mounted on a pair of uprights 97 secured to a plate 98. This plate is normally fixed during the operation of the machine, but is provided with a depending stud 99, (best shown at the lower right-hand side of Fig. 5) whereby it is pivoted to the base plate 29, and may be adjusted about the axis B—B of said stud, for a purpose which will presently appear, by means of a suitable adjusting device. In the present instance, (see Fig. 10) I have shown for this purpose a threaded rod 100 pivoted at 101 to the plate 98, and extending therefrom through a guide 102, (best shown in Fig. 11) the latter being pivoted on a stud 103 secured to the base plate 29. The threaded rod 100 passes loosely through the guide 102, but is adjustably fixed with reference thereto by a pair of nuts 103' and a pair of check-nuts 104 threaded onto the rod on opposite sides, respectively, of the guide. By this means, the entire work support may be adjusted horizontally, and the axis of the blank adjusted with reference to the axis of the cutter spindle.

The bearing 94 (see Fig. 5) is secured to a plate 105, superimposed upon the plate 98, and pivoted to swing about the axis B—B of the latter. To this end, (see the lower right-hand portion of Fig. 5) I have herein provided a pivotal bearing in the form of a circular block 106 having a reduced portion 107 passing through and forming a bearing for the plate 105, and secured in its place by one or more cap screws 108. An overlying portion 109 of the pivoted bearing 106 prevents the plate 105 from being accidentally lifted at one end, while its opposite end (at the left-hand side of Fig. 5) is mounted in a segmental guide 110, having one or more overlying caps 111, which prevent that end of the plate 105 from being lifted.

It must be evident that the rotation of the blank may be accomplished by imparting to the plate 105 a swinging motion, which will cause it to revolve the pinion 95 with reference to the relatively fixed segmental gear 96. To this end, I have herein provided adjusting means comprising a shaft 112 having right and left-hand threaded portions 113 and 114, one having screw-threaded engagement with a nut 115 pivoted to the plate 105, and the other having screw-threaded engagement with a nut 116 pivoted to the plate 98. The right and left-hand threaded portions 113 and 114 on the shaft 112 double the effective movement of the nut 115 produced by one revolution of the crank 117 and of the shaft 112. This shaft may be provided with a suitable hand-crank 117, by means of which it may be conveniently rotated, thereby swinging the plate 105 to and fro, and causing the blank to be rotated about its axis A—A, and revolved about the axis B—B of the segmental bevel gear 96, it being observed that the latter axis is the same as that of the pivotal bearing block 106, about which the plate 105 is turned. It should also be observed that the axis A—A of the blank 90 and pinion 95 intersects the axis B—B of the pivotal bearing 107, and that the apex of the pitch cone is coincident with such point of intersection. It will thus be evident that the blank may be given a rolling action corresponding to that which it has when in use, and this rolling action, taking place during the operation of cutting a given tooth, will cause the tool to generate the correct form of surface for the tooth upon a principle which is so well known as to require no further explanation.

Figures 6, 7:
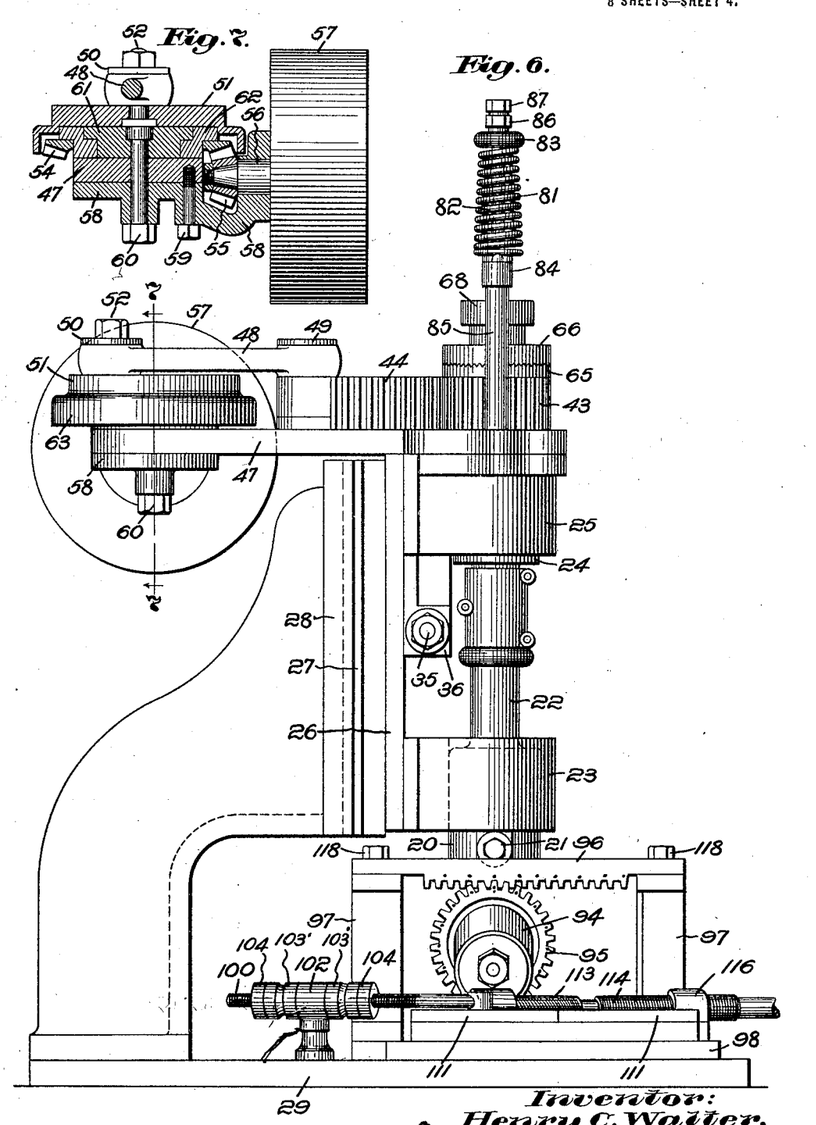
Fig. 6 is a side elevation of the machine as viewed from the left-hand side of Figs. 1 and 2.
Fig. 7 is a detail sectional view on line 7—7 of Fig. 6.

Re-setting of the blank from time to time, to bring a fresh portion in the proper position to be operated upon by the cutter may be readily accomplished by unmeshing the gears 95 and 96 and remeshing them in a new position for the next tooth, and so on around the blank until it has been completely cut. To facilitate the re-setting of the blank in this manner, the segmental pivoted gear 96 may be secured to the uprights 97 by a pair of cap screws 118, which may be removed to permit the gear 96 to be lifted out of mesh with the gear 95. The gears 95 and 96 may be provided in practice with suitable marks identifying a tooth of one gear with the proper corresponding indentation of the other gear to guide the workmen in meshing them in their proper relation. In the present example, I have shown for this purpose (see Fig. 6) two sets of dots, one set on the gear 95 and the other on the gear 96. Naturally, the number of teeth in the gear 95 will be the same as, or a multiple of, the number to be cut in the blank, and in practice I usually provide the gear 95 with twice the number of teeth as those of the blank. Under such circumstances, it is desirable, when the number of teeth to be cut in the blank is half the number of the teeth of the gear 95, to mark every other tooth of each of the gears 95 and 96, as shown in Fig. 6, to facilitate the re-meshing of gears.

Figure 13:
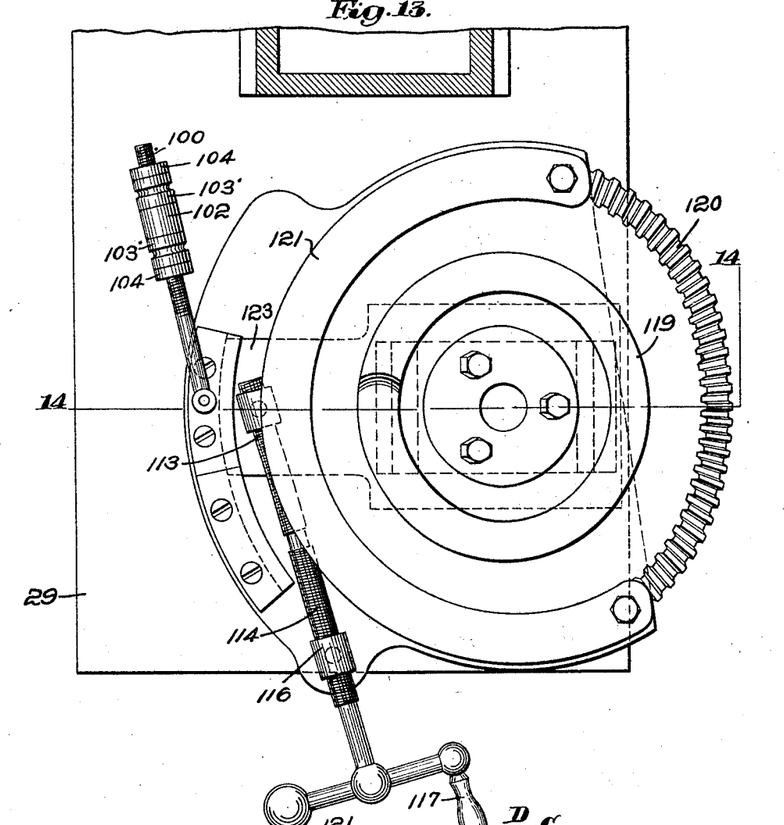
Fig. 13 is a plan similar to Fig. 10, but illustrating a work-holder adapted for use with a large bevel gear which is to mate with the bevel pinion.
Figure 14:
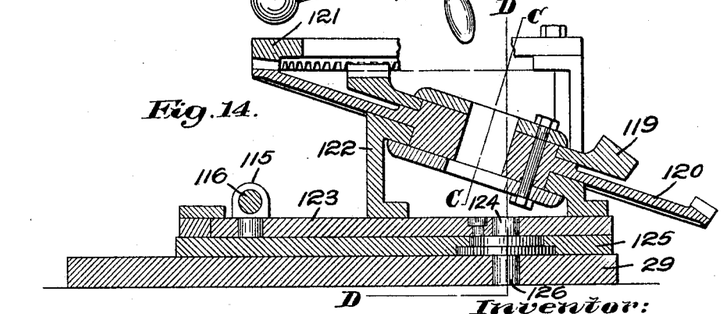
Fig. 14 is a sectional view on line 14—14 of Fig. 13.

Referring now to Figs. 13 and 14, I have there shown mounted upon the base plate 29 a work-holder adapted for the cutting of a bevel gear blank 119, which is suitably secured to a master gear 120, the latter meshing with a segmental gear 121. The master gear 120 is mounted to turn on a bearing bracket 122, supported on a plate 123 mounted on a pivot 124, the plate 123 in turn being mounted upon a second plate 125 mounted to turn about a pivot 126 upon the base plate 29. The plates 123 and 125 are provided with suitable means of adjustment similar to those employed in connection with the work-holder for the pinion, and in fact identical adjusting devices may be employed for both work-holders. In the case of the larger gear, the use of the adjustments and the mode of rolling the blank to generate the tooth form are similar to those already described in connection with the pinion, and therefore no further description is deemed necessary. It should here be observed that the axis C—C of the blank 119 and gear 120 intersects the axis D—D of the work-holder at a point which is co-incident with the apex of the pitch cone of the blank.

Figure 15:
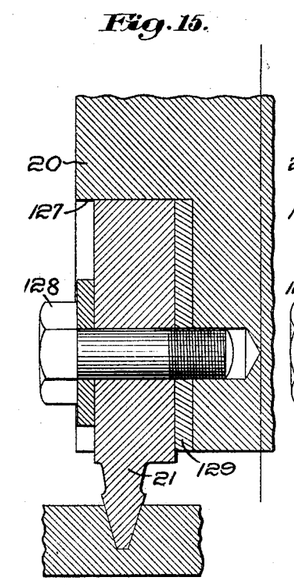
Figs. 15 and 15$^a$ are, respectively, a vertical sectional view and plan of a portion of the cutter head, cutter and a portion of a gear blank, showing the cutter in one position of adjustment with relation to the cutter head.
Figures 15A, 16A, 17A:
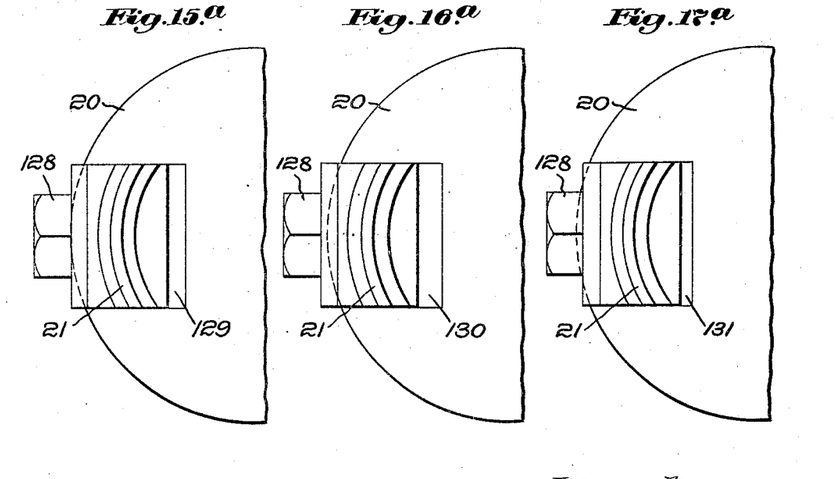
Figure 16:
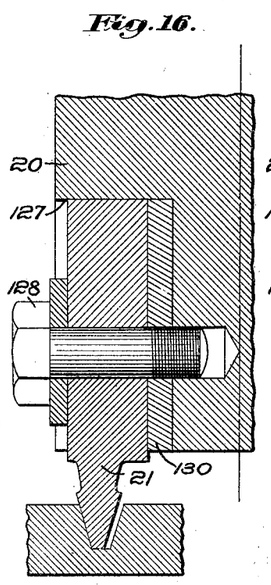
Figs. 16 and 16$^a$ are, respectively, a vertical sectional view of the cutter head, cutter and gear blank, illustrating the cutter in the second position of adjustment with relation to the cutter head.
Figure 17:
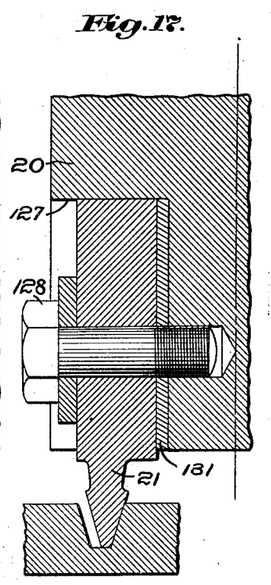
Figs. 17 and 17$^a$ are, respectively, a vertical sectional view of the cutter head, cutter and gear blank, illustrating the cutter in the third position of adjustment with relation to the cutter head.

In cutting either the gear or pinion, the first, or roughing, cut is made with the median line of the cutter co-incident with the median line of what is to be the space between two adjacent teeth in the completed gear. This cut is made in an obvious manner, by oscillating the cutter while advancing it gradually into the work. The cutter is then adjusted to a new position, with its median line at one side or the other of the median line of the space that is to be, the second cut is made, and the cutter is for a second time adjusted to a new position, with its median line at the opposite side of the median line of the space that is to be, and the third cut is then made. This will be best understood by reference to Figs. 15 to 17$^a$, inclusive, wherein I have shown the cutter head 20 provided with a recess 127 to receive the cutter 21, the latter being secured in its place by suitable means, herein a cap-screw 128 passing through the cutter, and threaded into the cutter head. As a means for properly positioning the cutter for each of the cuts just referred to, I may provide three blocks 129, 130 and 131, of different thicknesses, adapted to be interposed between the cutter and the adjacent face of the recess 127, the thickness of these blocks being such that, when the first is employed the cutter will be centrally located with respect to the space that is to be, when the second is put in place, the cutter is adjusted to one side of the median line of the space, and when the third is used, the cutter is adjusted to the other side of the space. The blocks, therefore, provide a simple, convenient and effective means for positioning the cutter in each of the three positions of adjustment which it is to occupy while making its three cuts.

It must be evident that, in order to produce a pinion and gear which will mate one with the other, one must be cut left-hand and the other right-hand; that is to say, in one, the curve of the tooth must extend in one direction, and in the other in the opposite direction. It is, therefore, evident that if the pinion be cut with the cutter standing on one side of the axis about which it oscillates, the other must be cut with the cutter standing on the opposite side. This shifting of the cutter from one side to the other can be accomplished conveniently by simply disconnecting the cutter spindle from the pinion by which it is oscillated, then turning the spindle around through an angle of 180 degrees, and finally securing the spindle to the pinion in the manner hereinbefore fully described.

The operation of producing the necessary cuts, rolling the blank to generate the tooth form, and shifting the blank for the cutting of the successive teeth, should now be evident without further description.

While I have herein shown and described one specific form or embodiment of my invention for illustrative purposes, and have disclosed and discussed in detail the construction and arrangement incidental to one specific application thereof, it is to be understood that the invention is limited neither to the mere details or relative arrangement of parts, nor to the specific embodiment herein shown, but that extensive deviations from the illustrated form or embodiment of the invention may be made, without departing from the principles thereof which are best defined in the following claims.

Having thus described my invention, what I claim and desire by Letters Patent to procure is:

1. In a machine for cutting gears, the combination of a work-holder, a cutting tool, means for oscillating said tool to produce a forward working stroke and a rearward non-working stroke, a rotatable work-holder whose axis is disposed at an angle to that about which said tool oscillates, and means including a removable, segmental bevel gear and a coöperating bevel gear to rotate said work holder about the axis of one of said gears and to revolve said work-holder about the axis of the other of said gears.

2. In a machine for cutting gears the combination of a cutting tool to provide a curved working stroke, a work holder for the gear blank having an arbor, a swinging support for said work holder, an indexing gear mounted on said arbor, a second gear having its axis coincident with the axis of said swinging support meshing with said indexing gear, and manually controlled means for effecting movement of said swinging support about its axis and the rolling of said indexing gear on the second gear to generate the tooth curve.

3. In a machine for cutting gears the combination of a cutting tool, an oscillatory support to which said cutting tool is rigidly attached, means for oscillating said oscillatory support to provide a curved working stroke of said tool, a work holder for the gear blank and means for imparting reciprocatory movement to said oscillatory support in the direction of its axis to provide a working stroke of said tool in one direction and a non-working stroke of said tool in the opposite direction.

4. In a machine for cutting gears the combination of a cutting tool, an oscillatory support therefor, means for oscillating said oscillatory support to provide a curved working stroke of said tool, a work holder for the gear blank, and feeding means for moving said oscillatory support with the cutting tool carried thereby.

5. In a machine for cutting gears the combination of a cutting tool, an oscillatory support therefor, means for oscillating said oscillatory support to provide a curved working stroke of said tool, a work holder, and means providing relative positioning of said tool and work holder to cut curved gear teeth of opposite curve.

6. In a machine for cutting gears the combination of a cutting tool, an oscillatory support therefor, a tool rigidly attached to said oscillatory support, means for axially reciprocating said support, and means for changing the operative distance between said tool and the axis of said oscillatory support.

7. The method of cutting gears having longitudinally curved teeth which comprises oscillating the cutting tool on a medial radius for the roughing cut on a plurality of teeth, and subsequently oscillating said cutting tool on longer and shorter radii for a finishing cut, while rolling the gear blank to generate the tooth curve.

8. The method of cutting gear teeth having longitudinally curved teeth which comprises oscillating the cutting tool about a given radius for cutting one face of a gear tooth, while rocking the gear blank to provide a lateral feed and to generate the tooth curve and subsequently oscillating the cutting tool about a different radius for cutting the other face of said gear tooth, while rocking the gear blank to provide a lateral feed in the opposite direction and to generate the tooth curve.

9. The method of cutting gear teeth having longitudinally curved teeth which comprises cutting one face of all the teeth of a gear by oscillating a cutting tool on a given radius, while rocking the gear blank in one direction to provide a lateral feed and subsequently oscillating a cutting tool on a different radius while rocking the gear blank in the opposite direction to provide a lateral feed in the opposite direction.

In testimony whereof I have signed my name to this specification in the presence of two subscribing witnesses.

HENRY C. WALTER.

Witnesses:
B. J. CONNOLLY,
F. E. LYTLE.